United States Patent [19]
Jonsson et al.

[11] Patent Number: 5,446,073
[45] Date of Patent: Aug. 29, 1995

[54] PHOTOPOLYMERIZATION PROCESS EMPLOYING A CHARGE TRANSFER COMPLEX WITHOUT A PHOTOINITIATOR

[75] Inventors: Sonny Jonsson, Marsta; Per-Erik G. Sundell, Borlange, both of Sweden; William R. Schaeffer, Mount Airy, Md.

[73] Assignee: Fusion Systems Corporation, Rockville, Md.

[21] Appl. No.: 41,423

[22] Filed: Mar. 31, 1993

[51] Int. Cl.$^6$ .................. C08F 2/46; C08F 2/48; C08F 216/12; C08F 222/06

[52] U.S. Cl. .................. 522/104; 522/107; 522/167; 522/168; 522/173; 522/174; 522/178; 522/181; 522/184; 522/913; 522/186; 522/188

[58] Field of Search ............. 522/107, 186, 188, 167, 522/168, 104, 173, 174, 178, 181, 184, 913; 430/58

[56] References Cited

U.S. PATENT DOCUMENTS

| | | | |
|---|---|---|---|
| 2,875,047 | 2/1959 | Oster | 96/35 |
| 2,880,152 | 3/1959 | Hiltz et al. | 204/158 |
| 3,137,643 | 6/1964 | Bell et al. | 204/154 |
| 3,669,825 | 6/1972 | Hall et al. | 161/188 |
| 4,056,391 | 11/1977 | Turner et al. | 522/88 |
| 4,112,146 | 9/1978 | Lazear | 427/54 |
| 4,749,807 | 6/1988 | Lapin et al. | 560/91 |
| 4,845,265 | 7/1989 | Lapin et al. | 560/84 |
| 5,004,762 | 4/1991 | Gupta | 522/121 |

FOREIGN PATENT DOCUMENTS

| | | |
|---|---|---|
| 0322808 | 7/1989 | European Pat. Off. . |
| WO10660 | 9/1990 | WIPO . |
| WO92/02572 | 2/1992 | WIPO . |

OTHER PUBLICATIONS

Schouten, et al., Non-Acrylate Free Radical Copolymerizable Systems for UV/EB Curing, RadTech, Boston, 1992.

Radak, Radiation Curing: New Market Rx, Reprinted from Chemical Business, Special Section, Oct. 1990.

Aspects of Photoinitiation—Call for Papers, Rad-Cure Services, Paint Research Association, Oct. 1993.

Olson, et al., Stereochemical Evidence for the Participation of a Comonomer Charge-Transfer Complex in Alternating Copolymerizations, Macromolecules, 1983, vol. 16, pp. 707–710.

Olson, et al., Stereochemical Evidence for Participation of a Donor–Acceptor Complex in Alternating Copolymerization. 1. Model Compound Synthesis, Macromolecules, 1984, vol. 17, pp. 2480–2486 and 2486–2501.

Butler, et al., Monomer Orientation Control by Donor–Acceptor Complex Participating in Alternating Copolymerization, Macromolecules, 1984, vol. 17, pp. 1884–1887.

Xi, et al., Esters of Alternating Copolymers of Maleic or 2,3-Dimethylmaleic Anhydride with Alkyl Vinyl Ethers, J. Polym. Sci., Polym. Chem. Ed., 1983, vol. 21, No. 3, pp. 891–911.

Lee, et al., Macromolecules, 1989, vol. 22, pp. 21–25.

Jonsson, et al., Direct Photolysis of Donor–Acceptor Complexes. A Photoinitiator Free AV Curable System. May, 1994.

*Primary Examiner*—Susan W. Berman
*Attorney, Agent, or Firm*—Pollock, Vande Sande & Priddy

[57] ABSTRACT

Composition containing charge transfer complex from at least one unsaturated compound having an electron donor group and having an electron withdrawing group and being free of any photoinitiating compound is polymerized by being subjected to ultraviolet light.

20 Claims, 6 Drawing Sheets

10" D BULB SPECTRAL RADIANCE
BULB SERIAL NUMBER: 4D-938    BULB PART NUMBER: 32844
D 10" 200-350
D 10" 350-600
D 10" 600-880
| INTERVAL (nm) | POWER WATTS | POWER ACCUM |
|---|---|---|
| 201 - 250 | 67.0 | 67 |
| 251 - 300 | 179.4 | 246 |
| 301 - 350 | 222.7 | 469 |
| 351 - 400 | 662.7 | 1132 |
| 401 - 450 | 349.1 | 1481 |
| 451 - 500 | 66.4 | 1547 |
| 551 - 600 | 55.7 | 1764 |
| 601 - 650 | 20.8 | 1785 |
| 651 - 700 | 11.6 | 1796 |
| 701 - 750 | 12.0 | 1808 |
| 751 - 800 | 13.2 | 1822 |
| 801 - 850 | 12.8 | 1834 |
| 851 - 880 | 2.2 | 1837 |
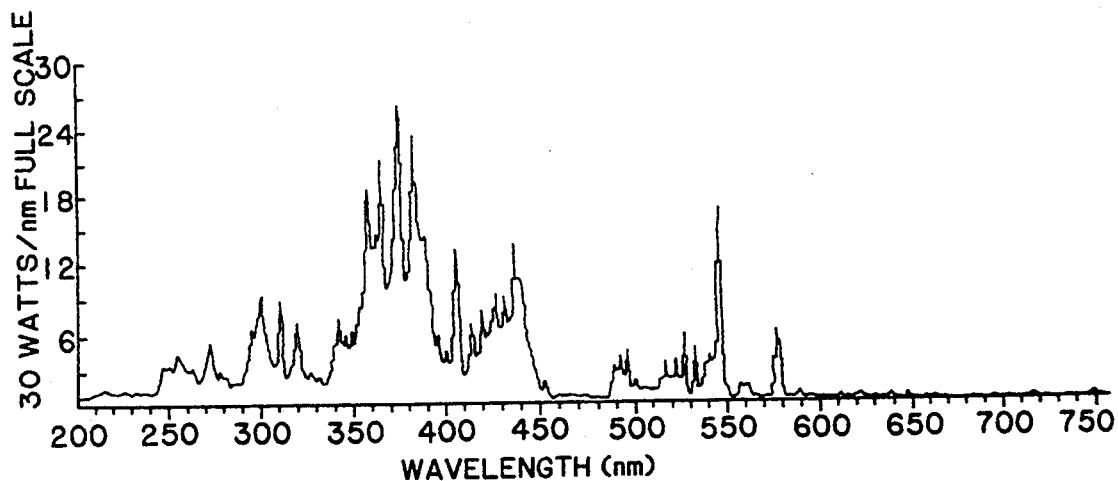
F I G. 5

5,446,073

PHOTOPOLYMERIZATION PROCESS EMPLOYING A CHARGE TRANSFER COMPLEX WITHOUT A PHOTOINITIATOR

TECHNICAL FIELD

The present invention is concerned with a polymerization process and especially with a polymerization process employing ultraviolet light. More particularly, the process of the present invention is concerned with polymerizing compositions that are free from photoinitiators but, nonetheless, can be polymerized employing ultraviolet light. The polymerizable compositions of the present invention contain a charge transfer complex from at least one unsaturated compound having an electron donor group and having an electron withdrawing group.

BACKGROUND ART

Industrial applications of radiation polymerizable coatings, inks and films have significantly increased over the last several years. One factor that has lead to the great interest in radiation polymerization has been environmental concern and particularly efforts to reduce solvent pollution of the atmosphere. Furthermore, radiation polymerization as compared to more traditional methods of polymerization require much less energy along with the possibility of significantly reduced cure times.

The two major sources of energy for radiation polymerization currently employed are ultraviolet light and electron beam. However, of the two sources, electron beam is significantly more expensive in view of the high cost of equipment necessary for such processing. Accordingly, the commercial energy source most favored for radiation polymerization is ultraviolet light, which provides for photopolymerization.

Typically, the photopolymerizable compositions contain a photosensitive monomeric and/or polymeric material along with a photoinitiator, a photosensitizer and adjuvant materials for providing particular properties. Continuing efforts are underway to develop materials that exhibit particular characteristics desired for a particular industrial application and/or to reduce the expense of the compositions employed and/or of the process.

It is therefore an object of the present invention to provide a photopolymerizable process which does not require a photoinitiator.

It has been suggested in the past to polymerize certain unsaturated monomers using ultraviolet light, without the addition of any photosensitizing substance. However, the wavelength of the ultraviolet light required is typically so short as to require the use of light sources and reaction vessels constructed of fused quartz or another substance transparent to short ultraviolet light. For example, see U.S. Pat. No. 2,880,152 to Hiltz et al. Therefore, such a process is not practiced from a commercial viewpoint. Another problem with such previously suggested systems is that in many cases only a thin layer of material at the surface is polymerized.

SUMMARY OF INVENTION

It has been found pursuant to the present invention that a composition that comprises a charge transfer complex that is obtained from at least one unsaturated compound that has an electron donor group and has an electron withdrawing group, can be photopolymerized employing ultraviolet light and does not require any photoinitiating compound. The at least one unsaturated compound includes a polymerizable unsaturated moiety bonded to the election donor group and another polymerizable unsaturated moiety bonded to the election withdrawing group.

By excluding the photoinitiator, the polymerized product obtained by the present invention is more stable and can be employed in outdoor application with no or minimal discoloration. Moreover, the ability to exclude the photoinitiator not only significantly reduces the cost since the photoinitiator is one of the more expensive ingredients of photopolymerizable compositions, but also improves the relative safeness of the composition since the photoinitiator is a significant contributor to toxicity of formulations in which such is present.

In addition, the compositions of the present surprisingly do not require relatively short wavelengths ultraviolet light for curing, but instead are curable with the more readily available longer wavelengths such as about 310 nanometers and above. Further, the curing of the compositions of the present invention is not restricted to only a thin layer at the surface, but instead can proceed throughout the thickness employed.

SUMMARY OF DRAWINGS

FIG. 5 illustrates the radiant spectral energy distribution for a Fusion F450 lamp with a D bulb.

BEST AND VARIOUS MODES FOR CARRYING OUT INVENTION

Figure 1:
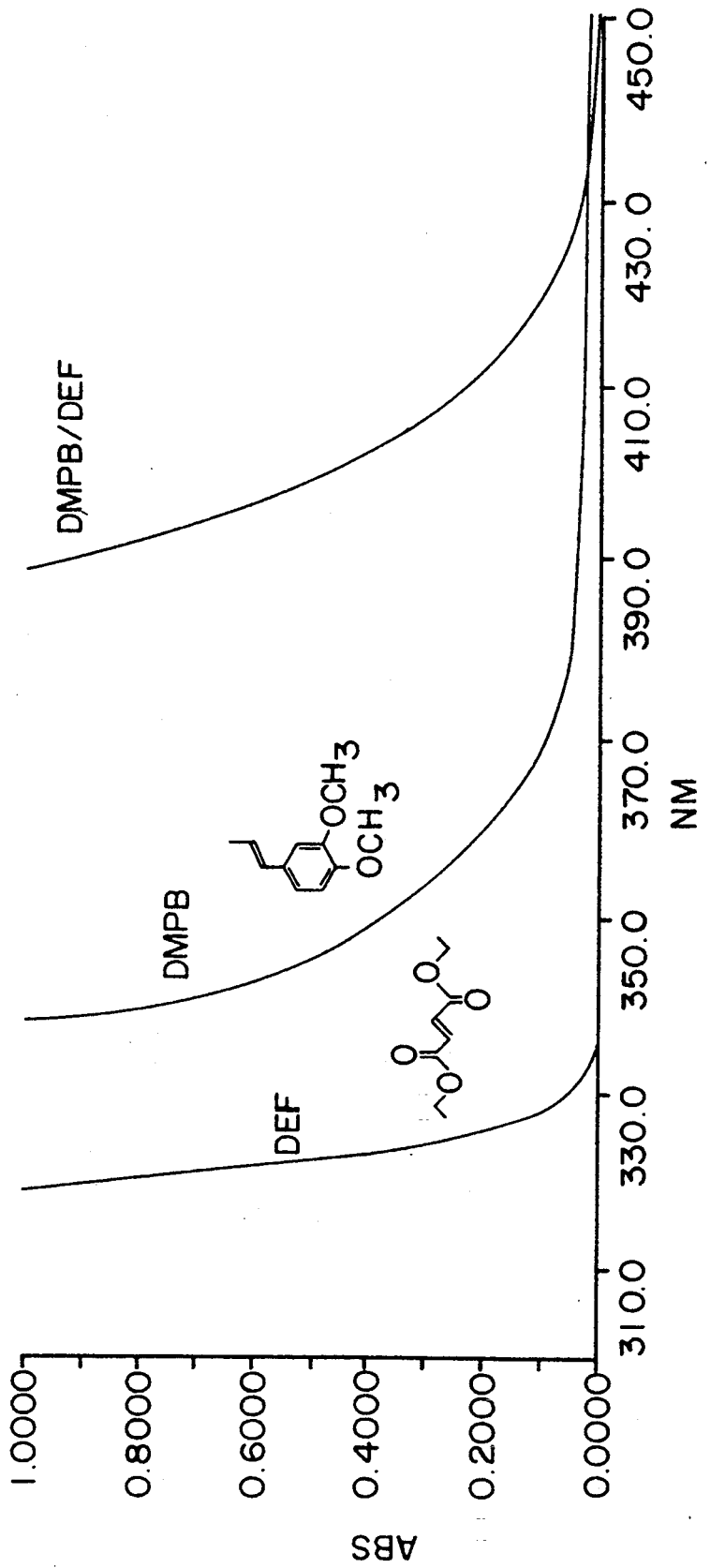
FIG. 1 shows the absorbtivity of a complex of the present invention.

The charge transfer complexes employed pursuant to the present invention are obtained from at least one unsaturated compound that has an electron donor group and has an electron withdrawing group. The at least one unsaturated compound includes a polymerizable unsaturated moiety bonded to the electron donor group and another a polymerizable unsaturated moiety bonded to the electron withdrawing group. The bonds are typically covalent bonds.

Objectives of the present invention can be achieved employing one unsaturated compound that contains both the electron donor group and the electron withdrawing group. Preferably the charge transfer complex is obtained from at least one unsaturated compound that has an electron donor group and at least one other unsaturated compound that has an electron withdrawing group.

The compounds employed to provide the charge transfer complex can be ethylenically unsaturated or acetylenically unsaturated. When the complex is from two or more compounds, typically, the double bond molar ratio of the electron donating compound to the electron withdrawing compound is about 0.5 to about 2, and more typically about 0.8 to about 1.2 and preferably about 1:1. The complexes employed pursuant to the present invention are stable under normal conditions.

In particular, the compositions do not spontaneously polymerize. In other words, the strength of both the donor and acceptor groups are not to the high level that could result in such spontaneous polymerization. Instead they polymerize under the influence of the necessary ultraviolet light.

For a complex to be suitable for the purposes of the present invention, such should absorb light that has a wavelength that is longer than the longest wavelength in the spectrum of light absorbed by the individual donor and withdrawing groups used to form the complex so that the ultraviolet light employed is absorbed by the complex rather than by the individual groups or components forming the complex. In other words, this difference in absorbtivity is sufficient so as to permit the polymerization of the complex to proceed by absorbing the light as contrasted to merely having the light absorbed by the individual groups or components thereof, resulting in conversion to heat energy but not polymerization.

From a commercial viewpoint, the complex absorbs light that has a wavelength that is at least about 10 nanometers longer than the longest wavelength in the spectrum of light absorbed by the individual donor and withdrawing groups or components since this facilitates tailoring the spectral output from the ultraviolet light source to assure the desired polymerization.

Moreover, the complex formed should not be one that upon initial exposure to ultraviolet light results in cleavage to a zwitterion state (that is where the positive and negative groups are equally ionized), but instead to a biradical that is capable of initiating free radical polymerization.

The electron withdrawing and electron donating compounds employed can be represented by the following formula:

$(A)_{\overline{n}}R$, and    1a $(D)_{\overline{n}}R$, respectively;    1c wherein n is an integer preferably from 1 to 4. R is the structural part of the backbone. A is the structural fragment imparting accepter properties to the double bond and is selected from the group consisting of maleic diesters represented by the formula:

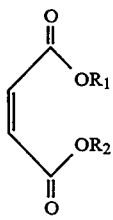    2 maleic amide halfesters represented by the formula:

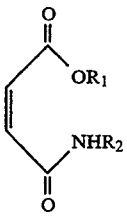    3 maleic diamides represented by the formula:

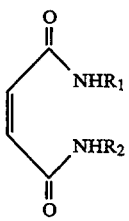    4 maleimides represented by the formula:

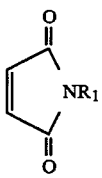    5 maleic acid halfesters represented by the formula:

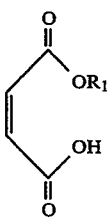    6 maleic acid half amides represented by the formula:

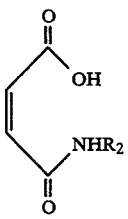    7 fumaric diesters represented by the formula:

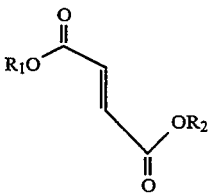    8 fumaric acid monoester halfamides represented by the formula:

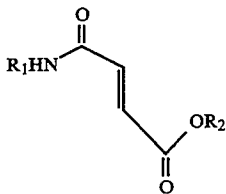

fumaric diamides represented by the formula:

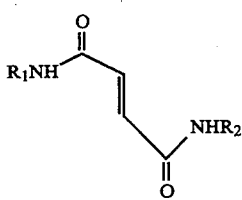

fumaric acid monoester represented by the formula:

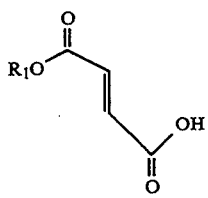

fumaric acid monoamides represented by the formula:

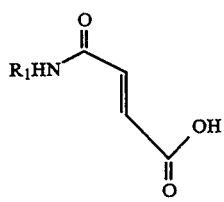

exomethylene structures represented by the formula:

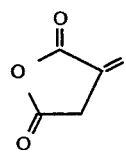

itaconic acid derivatives represented by the formula:

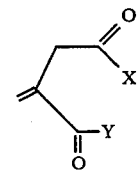

nitrile derivatives of formulae 2-14, and imide derivatives of formulae 2-14; and wherein each X and Y independently is selected from the group consisting of: OR$_1$, OR$_2$, NHR$_1$, NHR$_2$, NR$_1$, and OH and wherein each R$_1$ and R$_2$ in the above formulae 2-14 is independently an aliphatic group or aromatic group.

Typical aliphatic groups include alkyl groups having 1 to 22 carbon atoms and preferably 1-12 carbon atoms.

Typical aromatic groups include phenyl, benzyl, biphenyl.

Other examples of suitable compounds include the corresponding nitrile and imide derivatives of for instance maleic acid and fumaric acid.

Some specific electron withdrawing compounds are maleic anhydride, maleamide, N-methyl maleamide, N-ethyl maleamide, N-phenyl maleamide, dimethyl maleate, dimethyl and diethyl fumarate, adamantane fumarate, and fumaric dinitrile. Polyfunctional, that is polyunsaturated, compounds including that with two, three and four and even more unsaturated groups can likewise be employed, and in fact, are preferred.

Examples include polyethylenically unsaturated polyesters, for example, polyesters from fumaric acid and maleic acid or anhydride thereof.

D is the structural fragment imparting donor properties to the double bond and is selected from the group consisting of:

vinyl ethers represented by the formula:

alkenylethers represented by the formula:

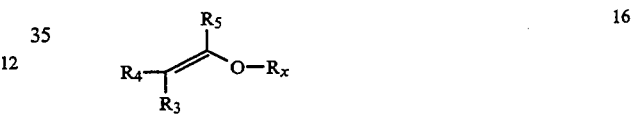

substituted cyclopentenes represented by the formula:

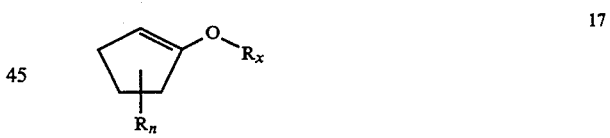

substituted cyclohexenes represented by the formula:

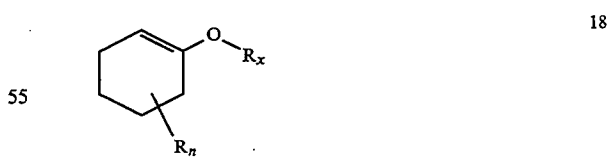

partially substituted furanes or thiophenes represented by the formula:

partially substituted pyranes or thiopyranes represented by the formula:

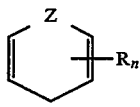

ring substituted styrenes represented by the formula:

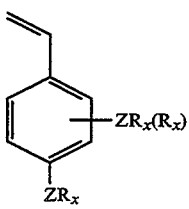

substituted alkenybenzenes represented by the formula:

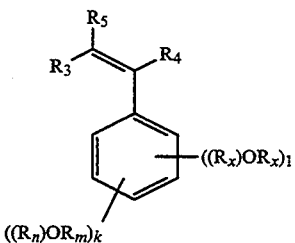

substituted alkenyl-cyclopentenes represented by the formula:

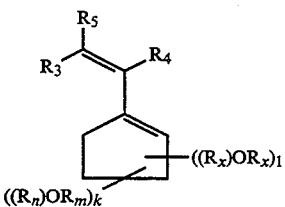

substituted alkenyl cyclohexenes represented by the formula:

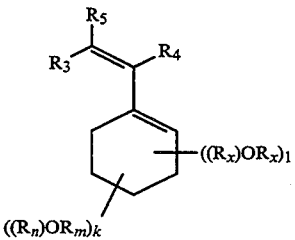

wherein n in the above formulae is an integer of 1–5, the maximum depending upon the number of carbon atoms in the ring; each $R_x$ and R is independently an aliphatic group typically containing 1 to 12 carbon atoms or aromatic group such as phenyl; each $R_3$, $R_4$ and $R_5$ independently is H or aliphatic, preferably alkyl having 1–12 carbon atoms such as methyl, ethyl and propyl; each Z is independently selected from the group of O and S, k and l are integers independently from o to 5 wherein $o=k+1 \leq 5$, In formulae 19 and 20 above, it is preferred that R is H and n is 2.

In formula 21, it is preferred that any of the substitutions be in the para and ortho positions only.

In addition, polyfunctional, that is, polyunsaturated compounds including those with two, three and four and even more unsaturated groups can likewise be employed, and in fact, are preferred.

With respect to the ethers, monovinyl ethers and divinyl ethers are especially preferred. Examples of monovinyl ethers include alkylvinyl ethers typically having a chain length of 1 to 22 carbon atoms and more typically 4–12 carbon atoms. Divinyl ethers include divinyl ethers of polyols having for example 2 to 6 hydroxy groups including ethylene glycol, propylene glycol, butylene glycol, 3 methyl propane triol and pentaerythritol.

Examples of some specific electron donating materials are monobutyl 4 vinyl butoxy carbonate, monophenyl 4 vinyl butoxy carbonate, ethyl vinyl diethylene glycol, p-methoxy styrene, 3,4 dimethoxy propenyl benzene, N-vinyl carbazole, propenyl diethylene glycol, N-propenyl carbazole, monobutyl 4 propenyl butoxy carbonate, monophenyl 4-propenyl butoxy carbonate, isoengenol, and 4-propenylanisole.

Typical bifunctional compounds that contain both an acceptor or withdrawing group and a donor group for 2 include compounds represented by formulae 2 to 12 above except that each $R_1$ and $R_2$ in formulae 2 to 12 is independently selected from the group consisting of

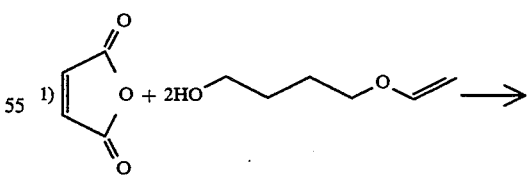

wherein n is at least 2 and typically 2 to about 12; $R^1$ is an aliphatic group, typically an alkyl group containing 1 to 2 carbon atoms; and aryl is an aromatic group such as phenyl.

Examples of suitable bifunctional compounds can be prepared by methods known in the art. For instance, typical compounds can be obtained from the following reactants:

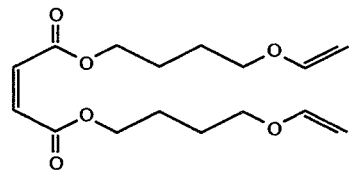

Maleic Anhydride    4-Hydroxybutylvinylether

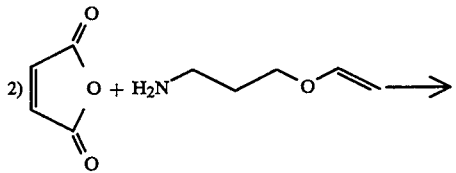

2) Maleic Anhydride + 3-Amino-n-propylvinylether →

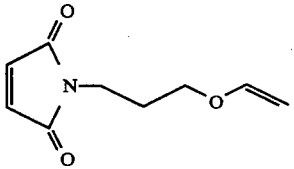

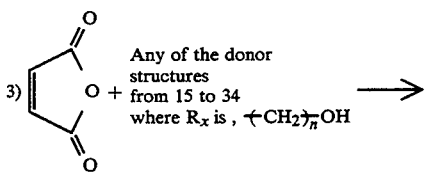

3) Maleic Anhydride + Any of the donor structures from 15 to 34 where $R_x$ is, $-(CH_2)_n-OH$ →

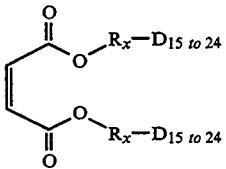

Pursuant to the present invention, the compositions are subjected to ultraviolet light to cause polymerization thereof. The ultraviolet light is preferably high intensity light to provide a dosage of at least about 200 millejoules per square centimeter of surface area of the composition being polymerized to achieve reasonable curing rates. In the event that lower energy light is to be employed, it is then desired to subject the compositions also to elevated temperatures in order to reduce the time for adequate polymerization to occur.

Figure 6:
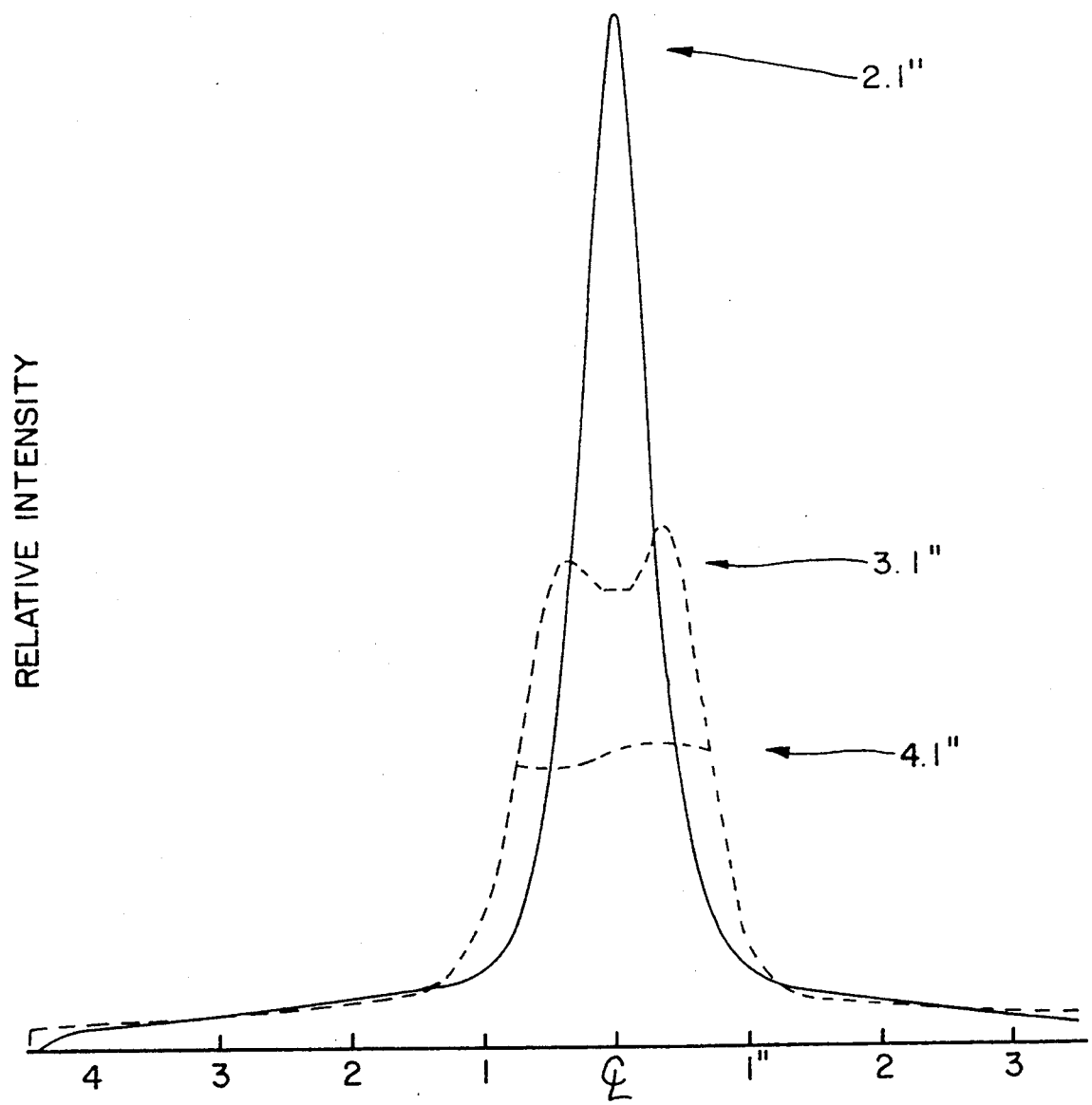
FIG. 6 illustrates a focal intensity profile for a Fusion 50 lamp.

In addition, the ultraviolet light employed typically has substantial magnitudes at wavelengths of at least about 310 nanometers. Suitable lamps employed to provide the desired high intensity and availability of wavelength and spectral distribution include that available from Fusion Systems, Corp. under the trade designation F-450 model with a D bulb. See FIG. 5 which illustrates a radiant spectral energy distribution for a Fusion 450 lamp with a D bulb, and FIG. 6 which illustrates a focal intensity profile for a Fusion 450 lamp. At typical band speeds of about 20 to about 100 feet per minute (FPM) such gives a peak irradiance of about 1 to about 2.6 watt/cm² of the surface area of the composition.

Figure 3:
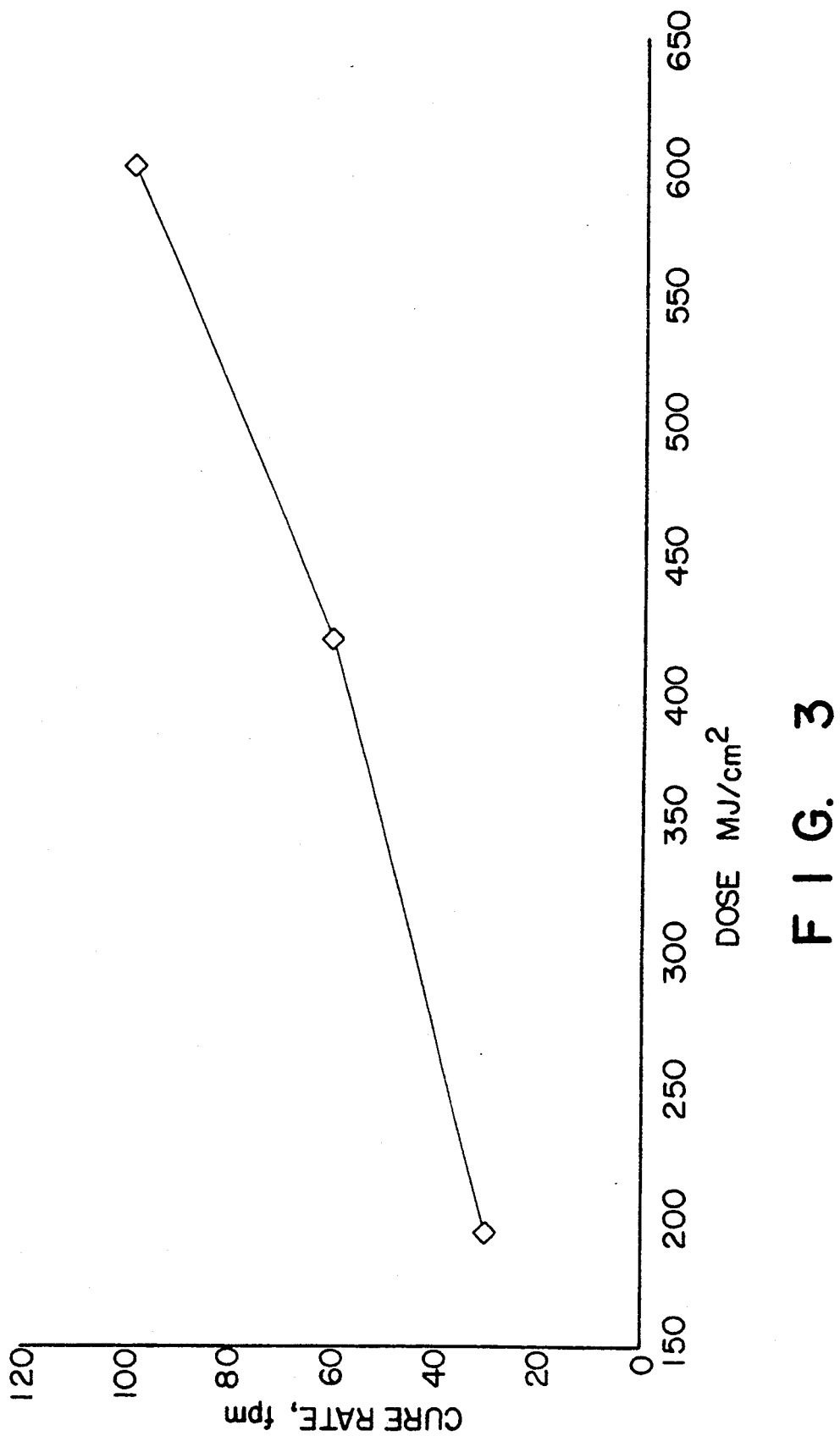
FIG. 3 illustrates irradiance peak for a lamp employed in the process of the present invention.
Figure 4:
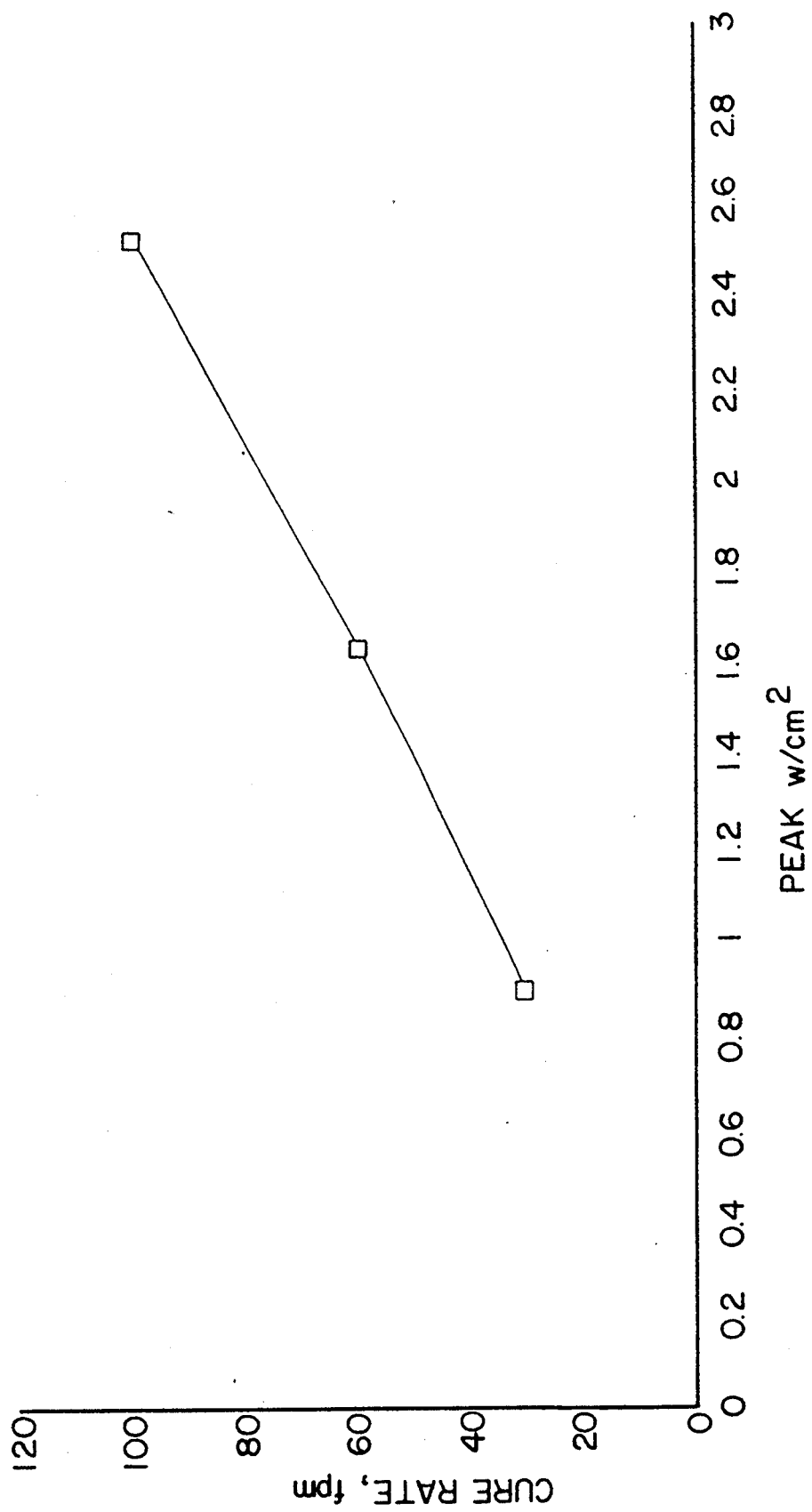
FIG. 4 illustrates dosages for a lamp employed in the process of the present invention.

FIGS. 3 and 4 illustrate the cure rate as a function of the irradiance peak and dose values respectively, for the above disclosed lamp.

Such lamp, which is exemplary of lamps suitable for carrying out the process of the present invention emit light having a spectrum mainly between 350 and 450 um and very low in deep UV as compared to more standard bulbs such as mercury bulbs. A description of lamps suitable for the present invention need not be described herein in any detail since such can be provided by those skilled in the art without undue experimentation. For instance, the lamp disclosed U.S. Pat. No. 4,042,850 to Ury et al., disclosure of which is incorporated herein by reference, but with a fill of 3.0 milligrams of iron iodide, 50 milligrams of mercury and 170 torr of Argon provides a spectrum rich in the 350 to 450 nanometer range.

According to the most preferred aspects of the present invention, in order to obtain cured coatings of reasonable curing speed and with commercially acceptable physical properties such as hardness and adhesion, the combination of a minimum dosage of at least about 200 millijoules per square centimeter of surface area of composition being polymerized; a peak intensity of at least about 500 milliwatts per square centimeter of surface area of the composition along with a light spectrum that is adapted to or overlaps the absorbance of the complex should be employed in combination. The value for peak intensity and dosage was determined using a "UVI-MAP" radiometer from Electronic Instrumentation & Technology, Inc. at wavelengths between 300 and 420 nanometers as discussed in May, et al., "UV Radiometer Matching Eliminates Reading Disagreement," 1992 Radtech Proceedings, disclosure of which is incorporated herein by reference (response curve for the UVI-MAP shown in FIG. 5 of article). According to information received from the manufacturer, the light admitting aperture of the UVIMAP is a circle which is 3 mm in diameter. It should be noted that direct photolysis of the change transfer complex can be carried out by using a conventional arc bulb irradiation source with a standard type Hg spectral distribution, but the irradiation time needed for relatively small degrees of conversion are from an industrial point of view too long. Moreover, the degree of polymerization in such a process is not enough to provide the level of physical properties achieved by following the preferred aspects of the present invention.

The compositions of the present invention are especially suitable for coating on to various substrates such as metal, plastic foils and films, wood, and glass.

Films of the compositions are typically about 1 micron to about 5 millimeters.

Moreover, as discussed above, since the compositions of the present invention do not include a photoinitiator, such compositions can be employed in outdoor applications without the fear of significant discoloration. Furthermore, photostabilizers can be added to the compositions to further guard against the potential of discoloration. It is further noted that the compositions of the present invention are readily polymerized in the presence of oxygen.

If desired, the compositions can include other conventionally employed additives such as surfactants, leveling agents, defoaming agents, photosensitizers, slip agents, fillers, and pigments. Of course, the compositions do not require these additives and can be free of any one or all of such additives.

Furthermore, the compositions of the present invention can be employed in conjunction with a typical acrylate photopolymerizable system such as an adjuvant thereto such as in amounts of about 95 to about 5 percent.

Reference to FIG. 1 illustrate the absorbtivity of a complex of diethyl fumarate and dimethoxy propylene benzene of the present invention as compared to the individual monomers thereof.

Figure 2:
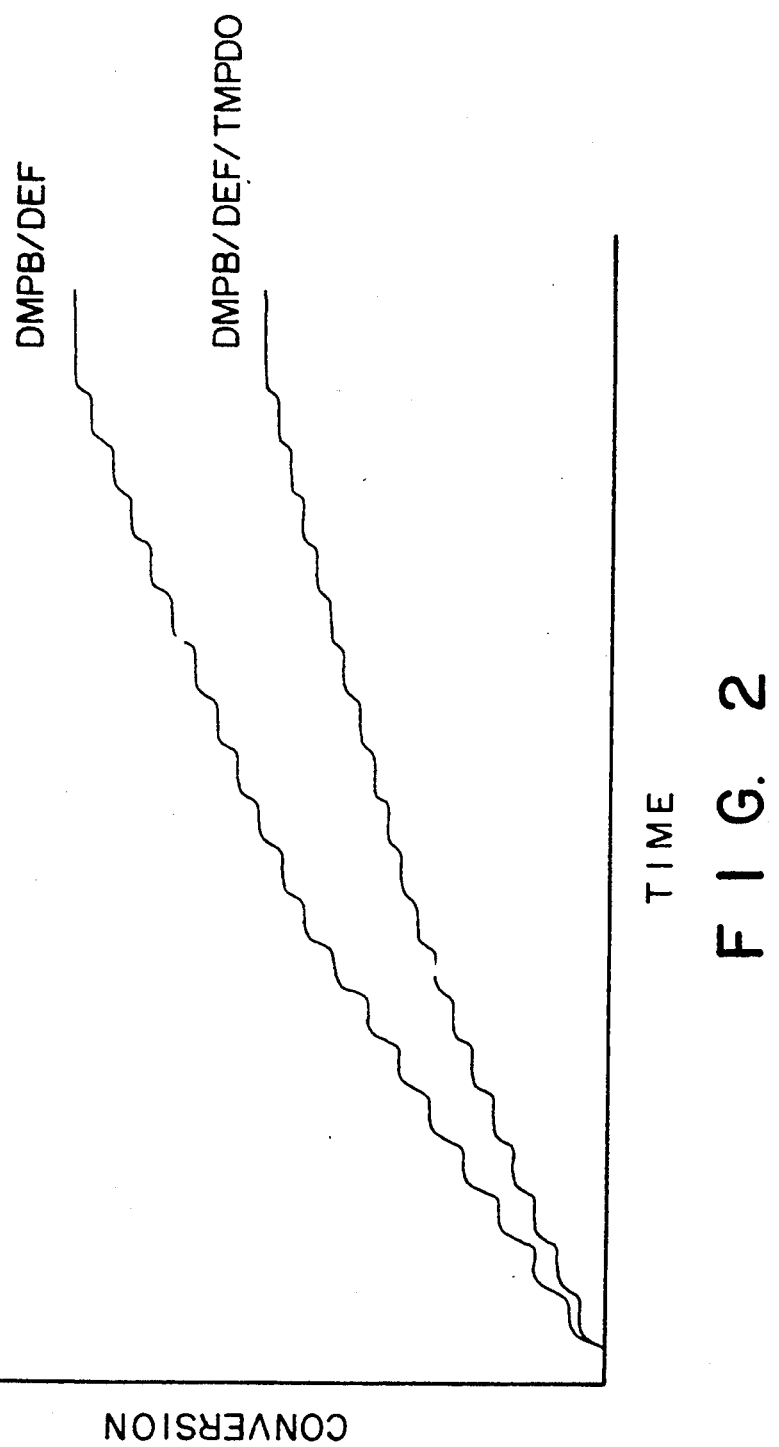
FIG. 2 shows the effect of adding a photoinitiater to a complex of the present invention.

FIG. 2 demonstrates that the addition of 1-2% of a photoinitiator (1,3,5 trimethyl benzoyl diphenyl phosphine oxide) to the diethyl fumarate/dimethoxy propylene benzene complex of the present invention actually resulted in worsening of the curing period.

The following non-limiting examples are presented to further illustrate the present invention.

EXAMPLE 1

A charge transfer complex from a 1:1 ratio of double bonds of maleic anhydride and 3 ethylene glycol divinyl ether is coated onto a glass substrate to a thickness of about 10 microns. The coated glass is passed beneath a Fusion 450 lamp having a D bulb at a speed of about 30 feet per minute at a peak ultraviolet light intensity of about 1 watt/$cm^2$ and at a dosage of about 200 millejoule/$cm^2$ (see FIGS. 3 and 4). The coating polymerizes to a hard fully cured coating throughout the thickness of the coating.

EXAMPLE 2

Example 1 is repeated except that the speed of about 60 feet per minute at a peak intensity of about 1.6 watts/$cm^2$ and dosage of about 425 millejoules/$cm^2$ (see FIGS. 3 and 4). The results obtained are similar to those of Example 1.

EXAMPLE 3

Example 1 is repeated expect that the speed of about 100 feet per minute at a peak intensity of about 2.6 watts/$cm^2$ and dosage of about 600 millejoules/$cm^2$ are employed. (See FIGS. 3 and 4). The results obtained are similar to those of Example 1.

EXAMPLE 4

A polyester having a molecular weight of about 1100 from about 35 parts by weight of fumaric acid, about 37 parts by weight of isophthalic acid, about 8 parts by weight of adipic acid and about 37 parts by weight of diethylene glycol is prepared. A charged transfer complex from a 1:1 ratio of double bonds of this polyester and diethylene divinyl ether is coated onto a glass substrate to a thickness of about 10 microns. The coated glass is passed beneath a Fusion 420 lamp at a speed 40 feet per minute at a peak ultraviolet light intensity of about 2.6 watts/$cm^2$ and a dosage of about 600 millejoule/$cm^2$.

EXAMPLE 5

A 1 to 1 double bond molar ratio mixture of maleic anhydride and p-methoxystyrene is cured into a hard film at a speed of about 40 feet per minute at a peak intensity of 1.6 W/$cm^2$. This corresponds to a dose of 430 mJ/$cm^2$. The irradiation was carried out by the use of the Fusion D bulb emission characteristics and F 600 lamp. Due to the strong CT complex formed, intense yellow color develops by mixing, the stability of the mixture at room temperature was only a few hours, before a gelation starts.

EXAMPLE 6

A 1 to 1 double bond molar ratio mixture of maleic anhydride and triethyleneglycoldivinylether is mixed with Ebecryl 230, from Radcure Specialties, U.S., an aliphatic multifunctional urethaneacrylate, in a ratio from 1:9. The curing is performed by the use of a Fusion D spectrum and at a peak intensity of 2.6 W/$cm^2$ at 20 to 30 feet per minute. Tough films with a film thickness from 20 to 500 um are obtained.

EXAMPLE 7

Example 6 is repeated except that the ratio of the charge transfer complex to Ebecryl 230 is 9:1. The results are similar to those from Example 6.

What is claimed is:

1. A polymerization process which comprises providing a composition comprising a charge transfer complex wherein said charge transfer complex is at least one member selected from the group consisting of:
   1. a bifunctional compound having both an electron donor group and an electron withdrawing group, and polymerizable unsaturated moiety; and
   2. a charge transfer complex prepared from
      a) at least one unsaturated compound having an electron donor group and a polymerizable unsaturated moiety; and
      b) at least one unsaturated compound having an electron acceptor group and a polymerizable unsaturated moiety;

and further provided that said charge transfer complex is capable of absorbing light having a wavelength that is longer than the longest wavelength in the spectrum of light absorbed by the individual donor and withdrawing groups used to form said complex in order that ultraviolet light is absorbed by the complex rather than by individual groups or components forming said complex, and wherein this difference in absorbtivity is sufficient so as to permit the polymerization of said complex to proceed by absorbing light; and wherein said composition is free of photoinitiating and photosensitizing compound;

subjecting said composition to ultraviolet light for a time sufficient to polymerize said complex: and
   wherein the peak intensity of said light is at least about 500 milliwatts/$cm^2$ of surface area of said composition as determined at wavelengths between 300 and 420 nanometers.

2. The process of claim 1 wherein said charge transfer complex is at least one member selected from the group consisting of:
   1. a charge transfer complex prepared from
      a) at least one unsaturated compound having an electron acceptor group and a polymerizable unsaturated moiety and being represented by the formula $$(A)_n R \qquad \text{1.a}$$

wherein R is the structural part of the backbone and A is the structural fragment imparting accepter properties to the double bond and is selected from the group consisting of maleic diesters represented by the formula:

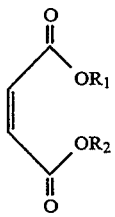

maleic amide half esters represented by the formula:

maleic diamides represented by the formula:

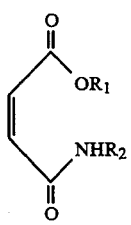

maleimides represented by the formula:

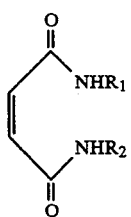

maleic acid halfesters represented by the formula:

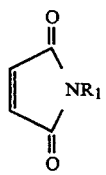

maleic acid half amides represented by the formula:

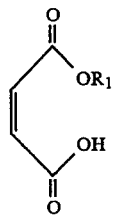

fumaric diesters represented by the formula:

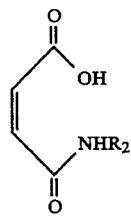

fumaric acid monoester halfamides represented by the formula:

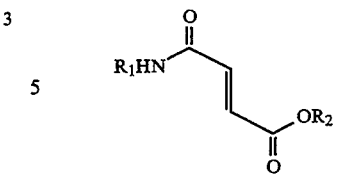

fumaric diamides represented by the formula:

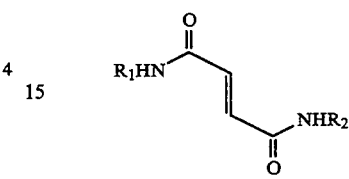

fumaric acid monoester represented by the formula:

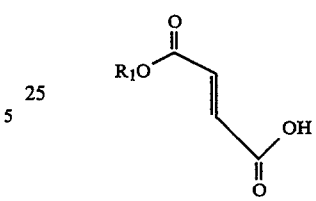

fumaric acid monoamides represented by the formula:

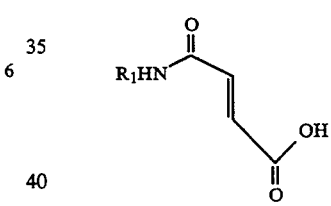

exomethylene structures represented by the formula:

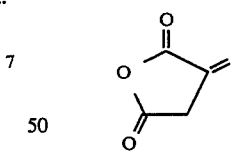

itaconic acid derivatives represented by the formula:

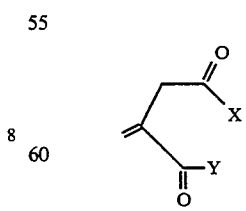

nitrile derivatives of formulae 2–14, and imide derivatives of formulae 2–14; and wherein each X and Y independently is selected from the group consisting of: $OR_1$, $OR_2$, $NHR_1$, $NHR_2$, $NR_1$, and OH and wherein each $R_1$ and $R_2$ in the above formulae 2–14 is independently an aliphatic group or aromatic group; and b) at least one unsaturated compound having an electron donor group and a polymerizable unsaturated moiety being represented by the formula:

wherein R is the structural part of the backbone and D is the structural fragment imparting donor properties to the double bond and is selected from the group consisting of:

vinyl ethers represented by the formula:

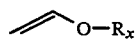

alkenylethers represented by the formula:

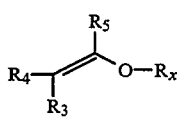

substituted cyclopentenes represented by the formula:

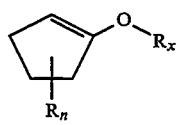

substituted cyclohexenes represented by the formula:

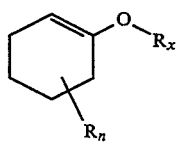

partially substituted furanes or thiophenes represented by the formula:

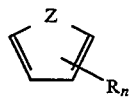

partially substituted pyranes or thiopyranes represented by the formula:

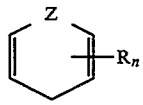

ring substituted styrenes represented by the formula:

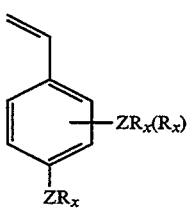

substituted alkenybenzenes represented by the formula:

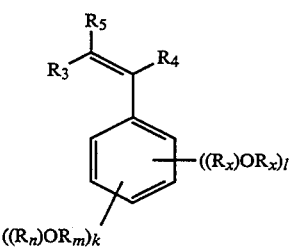

substituted alkenyl-cyclopentenes represented by the formula:

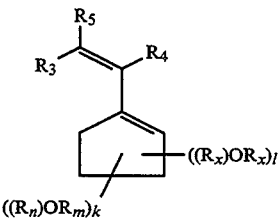

substituted alkenyl cyclohexenes represented by the formula:

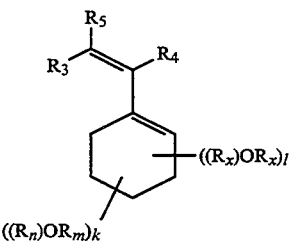

Each $R_x$ and R is independently an aliphatic group or aromatic group, each $R_3$, $R_4$ and $R_5$ independently is H or aliphatic; each Z is independently selected from the group of O and S, k and l are integers independently from 0 to 5 wherein $0=k+1\leqq 5$; and 2) a bifunctional compound having both an electron donor group and an electron acceptor and being represented by the formula:

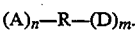

wherein R is the structural part of the backbone and A and D are at least one of said formulae 2 to 12 except that each $R_1$ and $R_2$ in formulae 2 to 12 is independently selected from the group consisting of:

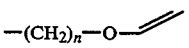

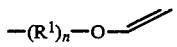

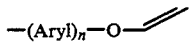

wherein n is at least 2 and $R^1$ is an aliphatic group and Aryl is an aromatic group.

3. The process of claim 1 wherein said composition is solvent free.

4. The process of claim 2 wherein n and $n^1$ in formulae 1a, 1b and 1c are integers from 1 to 4.

5. The process of claim 1 wherein said ultraviolet light has substantial magnitude of wavelengths of at least about 310 nanometers.

6. The process of claim 5 wherein said ultraviolet light contains more than half of its energy between 350 nanometers and 450 nanometers.

7. The process of claim 6 wherein said ultraviolet light is peaked between 350 nanometers and 450 nanometers.

8. The process of claim 1 wherein the dosage of ultraviolet light is at least about 200 millejoules per square centimeter of surface area of said composition.

9. The process of claim 1 wherein said charge transfer complex is obtained from at least one unsaturated compound having an electron donor group and at least one unsaturated compound having an electron withdrawing group.

10. The process of claim 9 wherein said complex absorbs light having a wavelength of at least about 10 nanometers greater than the highest wavelength in the spectrum of light absorbed by the compounds from which said complex was obtained.

11. The process of claim 9 wherein the molar ratio of the unsaturated bands of said compound having an electron donor group to said compound having an electron withdrawing group is about 0.5 to about 2.

12. The process of claim 11 wherein said molar ratio is about 0.8 to about 1.2.

13. The process of claim 11 wherein said molar ratio is about 1:1.

14. The process of claim 1 wherein said complex is a complex of diethyl fumarate and dimethoxy propylene benzene.

15. The process of claim 1 wherein said complex is a complex of maleic anhydride and 3 ethylene glycol divinyl ether.

16. The process of claim 15 wherein said complex absorbs light having a wavelength of at least about 10 nanometers greater than the highest wavelength in the spectrum of light absorbed by the compounds from which said complex was obtained.

17. The process of claim 1 wherein said ultraviolet light has a spectrum which is peaked between 350 nanometers and 450 nanometers and wherein more than half of the energy of said ultraviolet light is present between said wavelengths, and wherein the peak intensity of said light is at least about 500 milliwatts/$cm^2$ and wherein the dosage is at least about 200 millijoules/$cm^2$, the peak intensity and dosage being measured from light only at wavelengths of between 300 nanometers and 420 nanometers.

18. The process of claim 1 wherein said ultraviolet light has a spectrum substantially as shown in FIG. 5, and wherein the peak intensity of the ultraviolet light is at least about 500 watts/$cm^2$ and the dosage is at least about 200 millijoules/$cm^2$, said peak intensity and dosage being measured from light only at wavelengths of between 300 nanometers and 400 nanometers.

19. The process of claim 1 wherein a film of said composition is cured through its thickness.

20. The process of claim 19 wherein said film is about 1 micron to about 5 millimeters thick.

* * * * *